A. C. Stich,
Bed Spring,
No. 70,041. Patented Oct. 22, 1867.
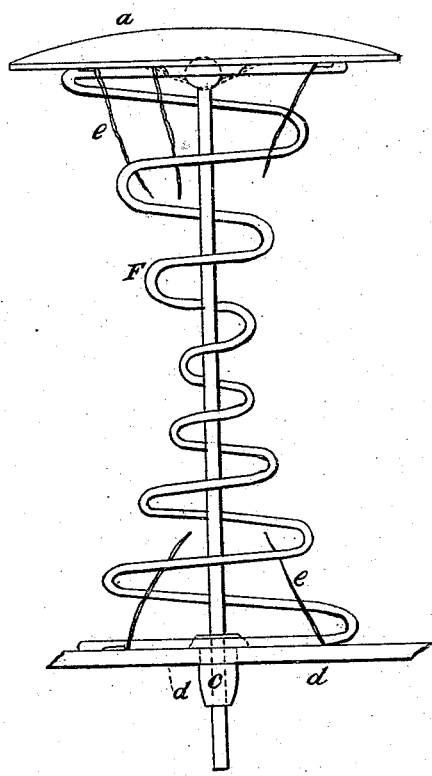
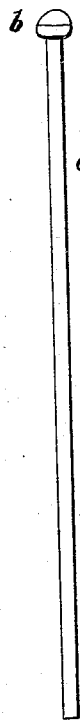
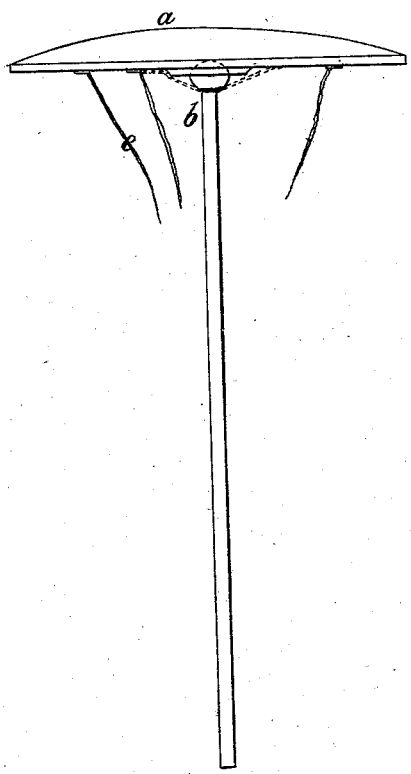
Witnesses:
C. P. Doan
George F. Green
Inventor:
Adolph C. Stich

United States Patent Office.

ADOLPH C. STICH, OF KALAMAZOO, MICHIGAN.

Letters Patent No. 70,041, dated October 22, 1867.

IMPROVED BED-SPRING GUIDE.

*The Schedule referred to in these Letters Patent and making part of the same.*

TO ALL WHOM IT MAY CONCERN:

Be it known that I, ADOLPH C. STICH, of Kalamazoo, in the county of Kalamazoo, and State of Michigan, have invented a new and improved form of Bed-Spring Guide; and I do hereby declare that the following is a full, clear, and exact description of the construction and operation of the same, reference being had to the annexed drawings making a part of this specification, in which—

Figure 1 is a side elevation of the whole thing together.

Figure 2, guide to spring.

Figure 3 is sleeve or thimble, seen also at fig. 1, resting in slat to bedstead represented, $d$, with a hole through its centre, so that guide, fig. 2, will pass through it free.

Figure 4 is guide, with ball-and-socket joint at the top end. The red line represents a leather strap, rubber, or any suitable material, to hold the ball in place.

The nature of my improvement consists in the construction of a round disk of wood, about six inches in diameter, rounding on the top side with ball-and-socket joint to its centre, so that it will give to any inequalities on its surface. A rod or guide, also attached to the ball joint, running down through a spiral spring, steadied at the bottom by sliding through a thimble or sleeve placed in the slats of the bedstead, so that the spring will work up and down, and keep itself perpendicular without the aid of strings, listing, or canvas to keep the springs from tipping over the guide, is to steady the spring.

To enable others skilled in the art to make and use my invention, I will proceed to describe its construction and operation.

I construct the rod or guide, fig. 2, of any suitable material, with ball or knob on the top end that will fit the socket on the under side of disk $a$. The top end of spiral spring F is attached to the lower side of disk $a$ in any of the known forms, and the same on the top side of slat $d$. The strips $e$ are to check the rattle of the springs when they come together.

Having described my invention, what I claim as new, and desire to secure by Letters Patent, is—

1. The guide, fig. 2, with spring F working through sleeve C set in slat D, in combination with socket-joint in disk $a$, operating in a manner set forth and described.

2. The ball joint in disk $a$, operating in the manner set forth and described.

ADOLPH C. STICH.

Witnesses:
  G. P. DOUN,
  GEORGE F. GREEN.